(12) United States Patent
Kim et al.

(10) Patent No.: US 7,928,795 B2
(45) Date of Patent: Apr. 19, 2011

(54) SEMICONDUCTOR DEVICE FOR CHARGE PUMPING

(75) Inventors: Joung-yeal Kim, Yongin-si (KR); Young-hyun Jun, Seoul (KR); Bai-sun Kong, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 58 days.

(21) Appl. No.: 12/458,533

(22) Filed: Jul. 15, 2009

(65) Prior Publication Data
US 2010/0026373 A1    Feb. 4, 2010

(30) Foreign Application Priority Data

Aug. 1, 2008    (KR) .................. 10-2008-0075618

(51) Int. Cl.
*G05F 1/10*    (2006.01)
(52) U.S. Cl. ...................................... 327/536
(58) Field of Classification Search .................. 327/536, 327/535, 537, 540–543, 589, 390
See application file for complete search history.

(56) References Cited

U.S. PATENT DOCUMENTS

| | | | | |
|---|---|---|---|---|
| 5,748,032 A | * | 5/1998 | Baek | 327/536 |
| 6,208,196 B1 | * | 3/2001 | St. Pierre | 327/536 |
| 7,385,440 B2 | * | 6/2008 | Aksin et al. | 327/589 |
| 7,436,241 B2 | * | 10/2008 | Chen et al. | 327/536 |
| 7,724,073 B2 | * | 5/2010 | Kim et al. | 327/536 |
| 2006/0087365 A1 | | 4/2006 | Cordoba et al. | |

FOREIGN PATENT DOCUMENTS

| JP | 2005-278378 | 10/2005 |
|---|---|---|
| KR | 10-0340866 | 6/2002 |

* cited by examiner

*Primary Examiner* — Hai L Nguyen
(74) *Attorney, Agent, or Firm* — Harness, Dickey & Pierce

(57) ABSTRACT

Provided is a semiconductor device for performing charge pumping. The semiconductor device may include a first pumping unit, a second pumping unit, and a controller. The first pumping unit may be configured to output a boosted voltage via an output node by using a first input signal and the initial voltage, where the boosted voltage is greater than an initial voltage. The second pumping unit may be configured to output the boosted voltage via the output node by using a second input signal and the initial voltage. The controller may be configured to control the first and second pumping units. Each of the first and second pumping units may include an initialization unit, a boosting unit, and a transmission unit. The initialization unit may be configured to control a voltage of a boosting node to be equal to the initial voltage during an initialization operation. The boosting unit may be configured to boost the voltage of the boosting node based on the first and second input signals. Also, the transmission unit may be configured to control output of the boosted voltage.

14 Claims, 7 Drawing Sheets

SEMICONDUCTOR DEVICE FOR CHARGE PUMPING

CROSS-REFERENCE TO RELATED APPLICATIONS

This U.S. non-provisional application claims priority under 35 U.S.C. §119 to Korean Patent Application No. 10-2008-0075618, filed on Aug. 1, 2008, in the Korean Intellectual Property Office, the entire contents of which are hereby incorporated herein by reference.

BACKGROUND

1. Field

Example embodiments relate to a semiconductor device (e.g., semiconductor device for charge pumping).

2. Description of Conventional Art

Semiconductor memory devices and/or circuits included in semiconductor memory devices may need to be supplied with a voltage that is higher than the conventional power supply voltage. A boosting circuit (e.g., a charge pump) that may be used to boost the power supply voltage has been proposed.

SUMMARY

Example embodiments provide a semiconductor device capable of increasing the efficiency of charge pumping by minimizing the amount of leakage current generated during charge pumping.

In an example embodiment, a semiconductor device for performing charge pumping may include a first pumping unit, a second pumping unit, and a controller. The first pumping unit may be configured to output a boosted voltage via an output node based on a first input signal and an initial voltage, such that the boosted voltage is greater than the initial voltage. The second pumping unit may be configured to output the boosted voltage via the output node based on a second input signal and the initial voltage. The controller may be configured to control the first and second pumping units based on at least a logic state of the first input signal and the second input signal. Each of the first and second pumping units may include an initialization unit, a boosting unit, and a transmission unit. The initialization unit may be configured to control a voltage of a boosting node to be equal to the initial voltage during an initialization operation. The boosting unit may be configured to boost the voltage of the boosting node to the boosted voltage based on one of the first and second input signals. The transmission unit may be configured to control output of the boosted voltage. The controller may (i) control the transmission unit to selectively output the boosted voltage, and/or (ii) disable the initialization unit, if the first input signal and the second input signal are in the same logic state.

BRIEF DESCRIPTION OF THE DRAWINGS

The accompanying figures are included to provide a further understanding of example embodiment, and are incorporated in and constitute part of this specification. In the figures.

DETAILED DESCRIPTION OF EXAMPLE EMBODIMENTS

Figure 1:
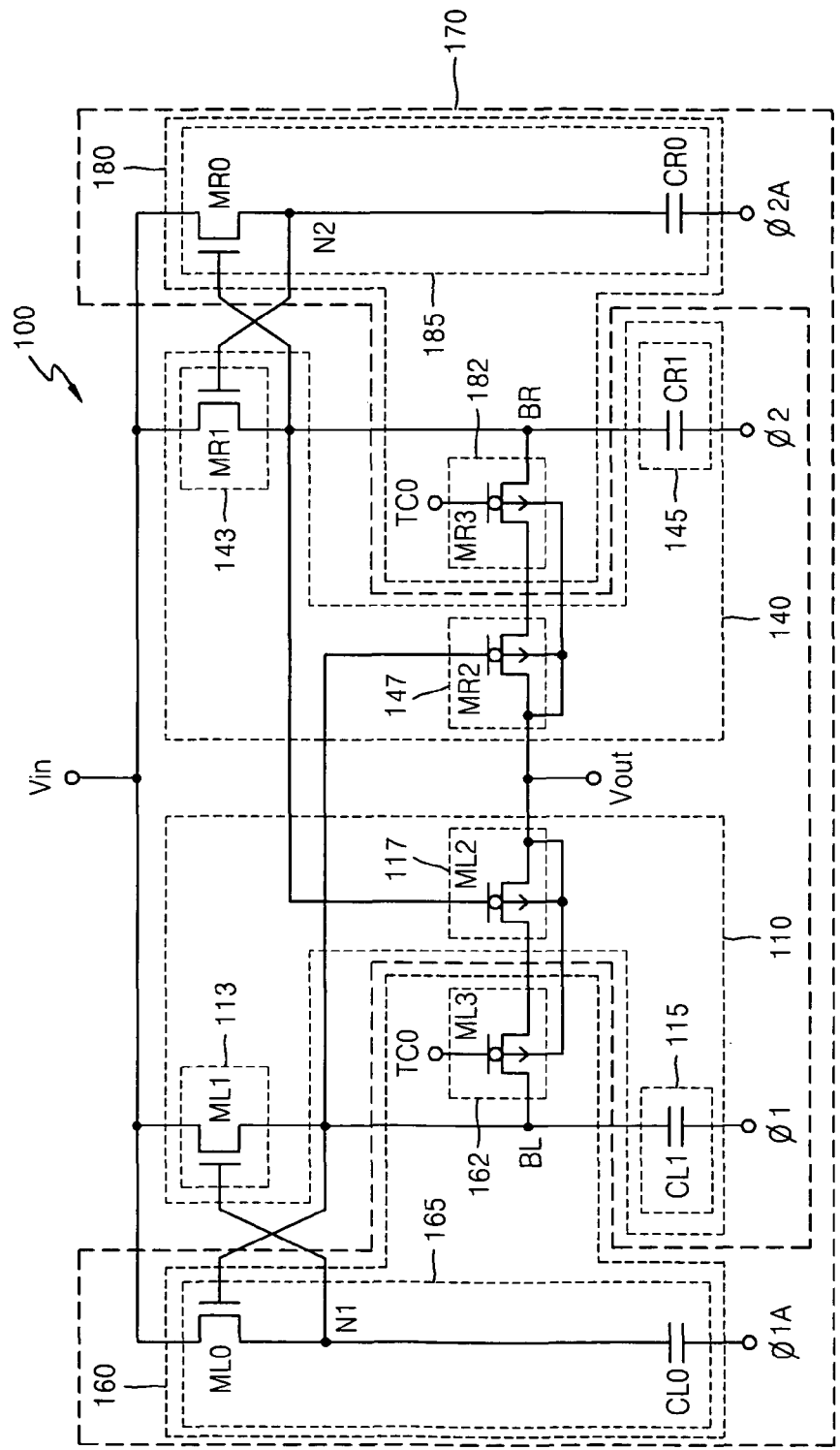
FIG. 1 is a circuit diagram of a semiconductor device for performing charge pumping according to an example embodiment.

Example embodiments may be embodied in many different forms and should not be construed as being limited to the embodiments set forth herein; rather, these embodiments may be provided so that this disclosure will be thorough and complete, and will fully convey the concept of example embodiments to those skilled in the art.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Example embodiments of the present concept will be described in detail with reference to the accompanying drawings. The reference numerals denote the same elements throughout the drawings.

FIG. 1 is a circuit diagram of a semiconductor device 100 for performing charge pumping according to an example embodiment. The semiconductor device 100 may include a first pumping unit 110, a second pumping unit 140 and a controller 170. The controller 170 includes first and second controller units 160 and 180. It should be noted that FIG. 1 illustrates only an example embodiment of a semiconductor device. Thus, further embodiments are not limited to the first pumping unit 110, the second pumping unit 140, the first controller unit 160 and the second controller unit 180. That is to say, various circuits may be used as long as the various circuits perform the operations of the first pumping unit 110, the second pumping unit 140, the first controller unit 160 and the second controller unit 180

Regarding FIG. 1, the first pumping unit 110 outputs a boosted voltage higher than an initial voltage Vin to an output node Vout by using a first input signal Ø1 and the initial voltage Vin, and the second pumping unit 140 outputs a boosted voltage higher than the initial voltage Vin to the output node Vout by using a second input signal Ø2 and the initial voltage Vin. The first pumping unit 110 may include a first initialization unit 113, a first boosting unit 115 and a first transmission unit 117. The second pumping unit 140 may include a second initialization unit 143, a second boosting unit 145 and a second transmission unit 147.

For an initialization operation, the first initialization unit 113 controls a voltage of a boosting node BL of the first pumping unit 110 (hereinafter referred to as a 'first boosting node') to be equal to the initial voltage Vin. For charge pumping, the first boosting unit 115 boosts the voltage of the first boosting node BL to a desired voltage by using the first input signal Ø1. The first boosting unit 115 may then output the boosted voltage to the first transmission unit 117 (according to another example embodiment), and/or a first transmission control unit 162 as illustrated in FIG. 1 (discussed further below). The first transmission unit 117 controls whether to apply the boosted voltage to the output node Vout.

Regarding the operation the second initialization unit 143, the operation of the second initialization unit 143 may be similar to the operation of the first initialization unit 113. Likewise, operation of the second boosting unit 145 and the second transmission unit 147 may be similar to the operation of the first boosting unit 115 and the first transmission unit 117, respectively. More specifically, the second initialization unit 143 controls a voltage of a boosting node BR of the second pumping unit 140 (hereinafter referred to as a 'second boosting node') to be equal to the initial voltage Vin. For charge pumping, the second boosting unit 145 boosts the voltage of the second boosting node BR to the desired voltage by using the second input signal Ø2. The second boosting unit 145 may then output the boosted voltage to the second transmission unit 147 (according to another example embodiment), and/or a second transmission control unit 182 as illustrated in FIG. 1 (discussed further below). The second transmission unit 147 controls whether to apply the boosted voltage to the output node Vout.

The operational relationship of the first pumping unit 110 and the second pumping unit 140 is briefly discussed. When the first pumping unit 110 performs the initialization operation, the second pumping unit 140 performs voltage boosting and outputs the boosted voltage to the output node Vout. Conversely, when the first pumping unit 110 performs voltage boosting and outputs the boosted voltage to the output node Vout, the second pumping unit 140 performs the initialization operation. The initialization operation and voltage boosting will be described in greater detail during the discussion of FIGS. 2A and 2B.

The first and second controller units 160 and 180 may: (i) control the boosted voltage to be applied to the output node Vout; and/or (ii) control the first and second initialization units 113 and 143 to be disabled if a certain logic state is provided by the input signals Ø1 and Ø2 (e.g., the first input signal Ø1 and the second input signal Ø2 are in the same logic state). The first controller unit 160 includes a first transmission control unit 162 and a first enable control unit 165. The second controller unit 180 includes a second transmission control unit 182 and a second enable control unit 185.

The first transmission control unit 162 is connected between the first boosting node BL and the first transmission unit 117. The second transmission control unit 182 is connected between the second boosting node BR and the second transmission unit 147. The first transmission control unit 162 and/or the second transmission control unit 182 may control whether to output the boosted voltage in response to a first control signal TCO. For example, the first control signal TCO may be in a first logic state if the first input signal Ø1 and the second input signal Ø2 are in the same logic state (e.g., Ø1=Ø2). Hereinafter, the first logic state of the first control signal TCO is logic high. The first control signal TCO may be in a second logic state if the first input signal Ø1 and the second input signal Ø2 are not in the same logic state (e.g., Ø≠Ø2). Hereinafter, the second logic state of the first control signal TCO is logic low. However, embodiments are not limited to these logic states. The same effect may be obtained even when the first logic state is logic low and the second logic state is logic high.

The first enable control unit 165 may control whether to enable the first initialization unit 113 in response to a second control signal Ø1A. The second control signal Ø1A may have the opposite phase to the first input signal Ø1, and/or may be in the second logic stage for a longer time interval than the time interval for the first input signal Ø1 in the first logic state. The second enable control unit 185 may control whether to enable the second initialization unit 143 in response to a third control signal Ø2A. The third control signal Ø2A may have the opposite phase to the second input signal Ø2 and/or may be in the first logic state for a longer time interval than the time interval for the second input signal Ø2 in the second logic state (discussed above). The operations of the first and second controller units 160 and 180 will be described later in detail with reference to FIGS. 2A and 2B.

The circuit constructions of the first pumping unit 110, the second pumping unit 140, the first controller unit 160 and the second controller unit 180 are described in further detail below.

Regarding the first pumping unit 110, the first initialization unit 113 may be embodied as a metal oxide semiconductor (MOS) transistor ML1 in which a first terminal is applied the initial voltage Vin, a second terminal is connected to the first boosting node BL, and a gate (third terminal) is supplied a signal output from the first enable control unit 165. The MOS transistor ML1 may be an NMOS transistor. The first boosting unit 115 may be embodied as a capacitor CL1 in which the first input signal Ø1 is supplied to one terminal and the other terminal is connected to the first boosting node BL. The first transmission unit 117 may be embodied as a MOS transistor ML2 in which a first terminal is connected to the first transmission control unit 162, a second terminal is connected to the output node Vout, and a gate is connected to the second boosting node BR. The MOS transistor ML2 may be a PMOS transistor.

Regarding the second pumping unit 140, the second initialization unit 143 may be embodied as a MOS transistor MR1 in which a first terminal is applied the initial voltage Vin, a second terminal is connected to the second boosting node BR, and a gate is supplied a signal output from the second enable control unit 185. The MOS transistor MR1 may be an NMOS transistor. The second boosting unit 145 may be embodied as a capacitor CR1 in which the second input signal Ø2 is supplied to one terminal and the other terminal is connected to the second boosting node BR. The second transmission unit 147 may be embodied as a MOS transistor MR2 in which a first terminal is connected to the output node Vout, a second terminal is connected to the second transmission control unit 182, and a gate is connected to the first boosting node BL. The MOS transistor MR2 may be a PMOS transistor.

Lastly, the first controller unit 160 and the second controller unit 180 are described. The first transmission control unit 162 may be embodied as a MOS transistor ML3 in which a first terminal is connected to the first boosting node BL, a second terminal is connected to the first transmission unit 117 and a gate is supplied the first control signal TCO. The second transmission control unit 182 may be embodied as a MOS transistor MR3 in which a first terminal is connected to the second transmission unit 147, a second terminal is connected to the second boosting node BR and a gate is supplied the first control signal TCO.

The first enable control unit 165 may be embodied as a MOS transistor ML0 and a capacitor CL0. In the MOS transistor ML0, a first terminal is applied an initial voltage Vin, a second terminal is connected to (i) an output node N1 of the first enable control unit 165 and (ii) the gate of the MOS transistor ML1 of the first initialization unit 113, and a gate is connected to the first boosting node BL. The MOS transistor ML0 may be an NMOS transistor. The second control signal Ø1A is supplied to one terminal of the capacitor CL0 and the other terminal of the capacitor CL0 is connected to the second terminal of the MOS transistor ML0.

The second enable control unit 185 may include a MOS transistor MR0 and a capacitor CR0. In the MOS transistor MR0, a first terminal is supplied the initial voltage Vin, a second terminal is connected to (i) an output node N2 of the second enable control unit 185 and (ii) the gate of the MOS transistor MR1, and a gate is connected to the second boosting node BR. The MOS transistor MR0 may be an NMOS transistor. The third control signal Ø2A is supplied to one terminal of the capacitor CR0 and the other terminal of the capacitor CR0 is connected to the second terminal of the MOS transistor MR0.

In an another example embodiment, the semiconductor device 100 may further include a control signal generation unit (not shown) that generates first through third control signals TCO, Ø1A, and Ø2A. An embodiment of the control signal generation unit will be described later with reference to FIGS. 4 through 5B.

Figure 2A:
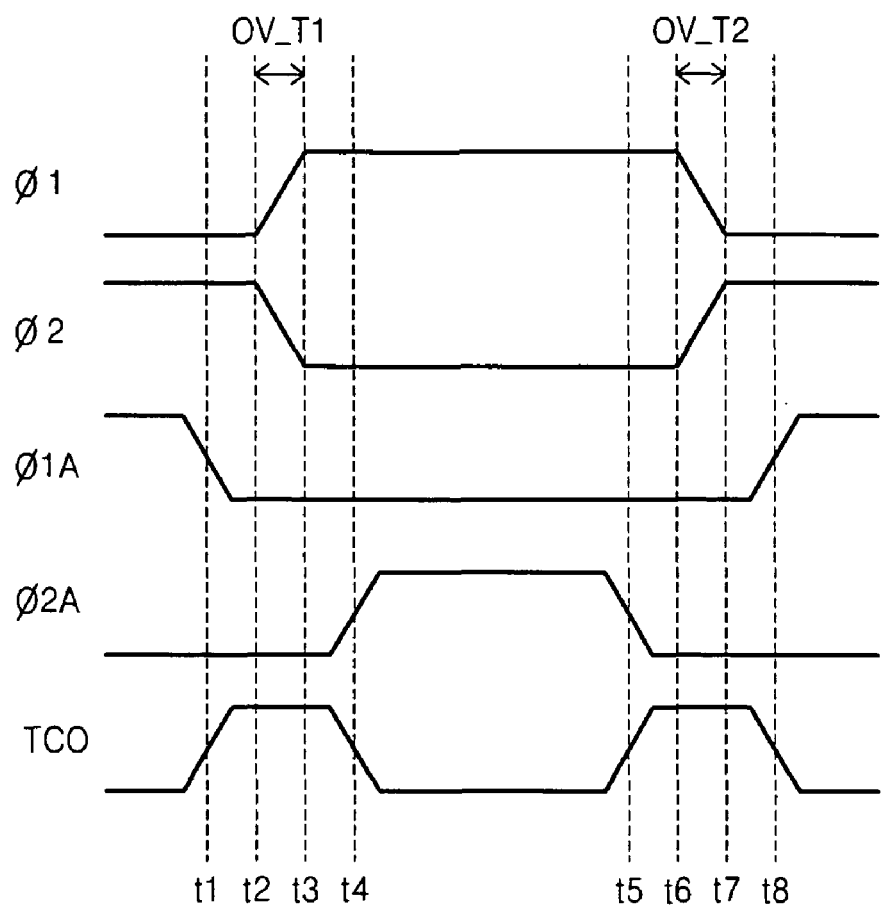
FIG. 2A is a waveform diagram of signals of the semiconductor device of FIG. 1, according to an example embodiment.

FIG. 2A is a waveform diagram of signals of the semiconductor device 100 of FIG. 1, according to an example embodiment.

Operation of the semiconductor device 100 when the phase of the first input signal Ø1 is opposite to that of the second input signal Ø2 is described with reference to FIGS. 1 and 2A. Before time t1, a first input signal Ø1, a first control signal TCO and a third control signal Ø2A are in the second logic state and a second input signal Ø2 and a second control signal Ø1A are in the first logic state. In this case, the MOS transistors ML1, ML3, MR2, MR3, and MR0 are turned on and the MOS transistors ML0, ML2, and MR1 are turned off. Thus the capacitor CL1 is charged with electric charges until a voltage of the capacitor CL1, i.e., a voltage of the first boosting node BL, is equal to the initial voltage Vin. Such an operation of equalizing the voltage of the capacitor CL1 with the initial voltage Vin is referred to as the initialization operation. Similarly, the second enable control unit 185 performs the initialization operation, and thus a voltage of the output node N2 of the second enable control unit 185 becomes equal to the initial voltage Vin.

At the time t1, the first control signal TCO is in the first logic state and the second control signal Ø1A is in the second logic state. Thus the MOS transistor ML1 is turned off after the time t1.

In a time interval between times t2 and t3, transition of the first input signal Ø1 and the second input signal Ø2 occur. In the time interval between the times t2 and t3, the first control signal TCO is in the first logic state and the second and third control signals Ø1A and Ø2A are in the second logic state. The MOS transistors ML1, ML3, MR1, and MR3 are turned off and no electric charges move from the first boosting node BL and the second boosting node BR to a node to which the initial voltage Vin is to be applied. Also, no electric charges move from the output node Vout to the first boosting node BL and the second boosting node BR. Thus there is no leakage current generated in the time interval where the transition of the first input signal Ø1 and the second input signal Ø2 occur, thereby preventing a pumping loss and a short-circuit loss from occurring. Furthermore, in a time interval between times t1 to t4, MOS transistors ML1, ML3, MR1, and MR3 are turned off and thus the semiconductor device 100 does not perform a normal charge pumping operation.

Conventionally, the pumping loss and short-circuit loss may occur due to the leakage current in the time interval where the transition of the first input signal Ø1 and the second input signal Ø2 occur. For example, a conventional semiconductor device may be assumed to include a power supply voltage VDD, but not include either the first controller unit 160 or the second controller unit 180 (the conventional semiconductor device not illustrated). Pumping loss and short circuit loss may occur in such a conventional semiconductor device. The pumping loss and short circuit loss phenomena are discussed in the context of the conventional semiconductor device.

Pumping loss occurs in a conventional semiconductor when electric charges in the capacitors CL1 and CR1 move to the initial voltage Vin node rather than the output node Vout. A more detailed explanation of pumping loss is provided. A conventional semiconductor device may have the initial voltage Vin be equal to the power supply voltage VDD and the first input signal Ø1 and the second input signal Ø2 in the first logic state. Since a conventional semiconductor device lacks either the first controller unit 160 or the second controller unit 180, the MOS transistor ML1 is turned on when a voltage that is equal to or greater than the sum of the power supply voltage VDD and a threshold voltage Vth of the MOS transistors ML1 is applied to a gate thereof. The MOS transistor MR1 is turned on when a voltage that is equal to or greater than the sum of the power supply voltage VDD and a threshold voltage Vth of the MOS transistors MR1 is applied to a gate thereof. When the first input signal Ø1 of the conventional semiconductor device transits from the second logic state to the first logic state, the voltage of the first boosting node BL changes from VDD to 2VDD. Also, when the second input signal Ø2 of the conventional semiconductor device transits from the first logic state to the second logic state, the voltage of the first boosting node BL changes from 2VDD to VDD. Thus, during a time interval of such a transition, in which the first input signal Ø1 and the second input signal Ø2 have a voltage between VDD+Vth and 2VDD−Vth, the conventional semiconductor device operates with the first input signal Ø1 and the second input signal Ø2 in the first logic state. That is, in the above time interval, the MOS transistors ML1 and MR1 are turned on and the MOS transistors ML2 and MR2 are turned off. Accordingly, electric charges in the capacitors CL1 and CR1 move to a node to which the initial voltage Vin is applied rather than the output node Vout, thereby causing discharging of capacitors CL1 and CR1. Such a phenomenon is referred to as the pumping loss.

However, the semiconductor device 100 according to an example embodiment addresses the above discussed pumping loss that occurs in the conventional semiconductor device. More specifically, in the semiconductor device 100, MOS transistors ML1, ML3, MR1, and MR3 are turned off during the time interval between times t1 and t4, which include the time interval where the pumping loss occurs. Thus, the semiconductor device 100 prevents the pumping loss from occurring.

On the other hand, short-circuit loss occurs in the conventional semiconductor device when electric charges stored in a capacitor connected to the output node Vout move toward the nodes BL and BR. A more detailed explanation of short-circuit loss is provided. In the time interval where transition of the first input signal Ø1 and the second input signal Ø2 occur, either (i) the MOS transistors ML1 and ML2 or (ii) the MOS transistors MR1 and MR2 are concurrently turned on. The output node Vout of a conventional semiconductor device is generally connected to a capacitor and thus the capacitor is charged with electric charges moving to the output node Vout. During the time interval where either (i) the MOS transistors ML1 and ML2 or (ii) the MOS transistors MR1 and MR2 are concurrently turned on, the electric charges stored in the capacitor connected to the output node Vout moves toward the nodes BL and BR. The flow of charge from the capacitor connected to Vout causes a discharging of the capacitor. Such a phenomenon is referred to as the short-circuit loss.

However, the semiconductor device 100 according to an example embodiment addresses the above discussed short circuit loss that occurs in the conventional semiconductor device. Like the conventional semiconductor device, the semiconductor device 100 may be connected to a capacitor and thus the capacitor is charged with electric charges moving to the output node Vout. However, in the semiconductor device 100, MOS transistors ML1, ML3, MR1, and MR3 are turned off during the time interval between t1 and t4, which include the time interval where the short-circuit loss occurs. Thus, the example embodiment prevents the short-circuit loss from occurring.

Returning to semiconductor device 100, in a time interval between times t4 and t5, the semiconductor device 100 normally performs charge pumping. The first input signal Ø1 and the third control signal Ø2A are in the first logic state. The second input signal Ø2, the first control signal TCO and the second control signal Ø1A are in the second logic state. Thus, the MOS transistors ML0, ML2, ML3, MR1, and MR3 are turned on and the MOS transistors ML1, MR0, and MR2 are turned off. In this case, since the first input signal Ø1 is in the first logic state, the voltage of the first boosting node BL is boosted to the sum of the initial voltage Vin and the voltage of the first input signal Ø1. Also, since the transistors ML3 and ML2 are turned on, the voltage of the first boosting node BL is applied to the output node Vout. Such an operation of boosting a voltage and outputting the boosted voltage is referred to as voltage boosting. In a time interval between times t3 and t4, the following occur: (i) the first pumping unit 110 and the second enable control unit 185 perform voltage boosting; and (ii) the second pumping unit 140 and the first enable control unit 165 perform the initialization operation. For example, if the initial voltage Vin is equal to the power supply voltage VDD and the first input signal Ø1 and the second input signal Ø2 have the power supply voltage VDD when they are in the first logic state, both the first boosting node BL and the output node N2 of the second enable control unit 185 have a voltage 2VDD.

At the time t5, the first control signal TCO is in the first logic state and the third control signal Ø2A is in the second logic state. Thus, the MOS transistors MR1, MR3, and ML3 are turned off after the time t4.

During a time interval between times t6 and t7, the logic states of the first input signal Ø1 and the second input signal Ø2 transition to states opposite to the logic state transition undertaken during the time interval between t2 and t3. In the time interval between times t6 and t7, the first control signal TCO is in the first logic state and the second and third control signals Ø1A and Ø2A are in the second logic state as in the time interval between times t2 and t3. Thus, the MOS transistors ML1, ML3, MR1, and MR3 are turned off. Therefore, no electric charges may move from (i) the first boosting node BL and (ii) the second boosting node BR, to a node to which the initial voltage Vin is applied. Also, no electric charges may move from the output node Vout to (i) the first boosting node BL and (ii) the second boosting node BR. Accordingly, no leakage current is generated during the time interval where transition of the first input signal Ø1 and the second input signal Ø2 occur, thereby preventing the pumping loss and the short-circuit loss from occurring. As described above, in this case, the MOS transistors ML1, ML3, MR1, and MR3 are also turned off during the time interval between the times t5 and t8. That is, the MOS transistors ML1, ML3, MR1, and MR3 are turned off during a time interval where the pumping loss and the short-circuit loss occur, thereby preventing the pumping loss and the short-circuit loss from occurring.

After the time t8, the semiconductor device 100 may perform charge pumping again. More specifically, (i) the second input signal Ø2 and the second control signal Ø1A may be in the first logic state, and (ii) the first input signal Ø1, the first control signal TCO and the third control signal Ø2A may be in the second logic state. In such a situation, the MOS transistors ML1, ML3, MR0, MR2, and MR3 are turned on and the MOS transistors ML0, ML2, and MR1 are turned off. Thus, the second pumping unit 140 and the first enable control unit 165 perform voltage boosting, and the first pumping unit 110 and the second enable control unit 185 perform the initialization operation.

As illustrated in FIG. 2A, when the first input signal Ø1 has a phase opposite to that of the second input signal Ø2, the leakage current is generated during the transition time intervals OV_T1 and OV_T2 of the first input signal Ø1 and the second input signal Ø2, thereby causing the pumping loss and the short-circuit loss. However, according to the illustrated example embodiment, during the transition time intervals OV_T1 and OV_T2, the MOS transistors ML1, ML3, MR1, and MR3 are turned off, and thus, there is no leakage current generated. The absence of leakage current prevents the pumping loss and the short-circuit loss from occurring.

Figure 2B:
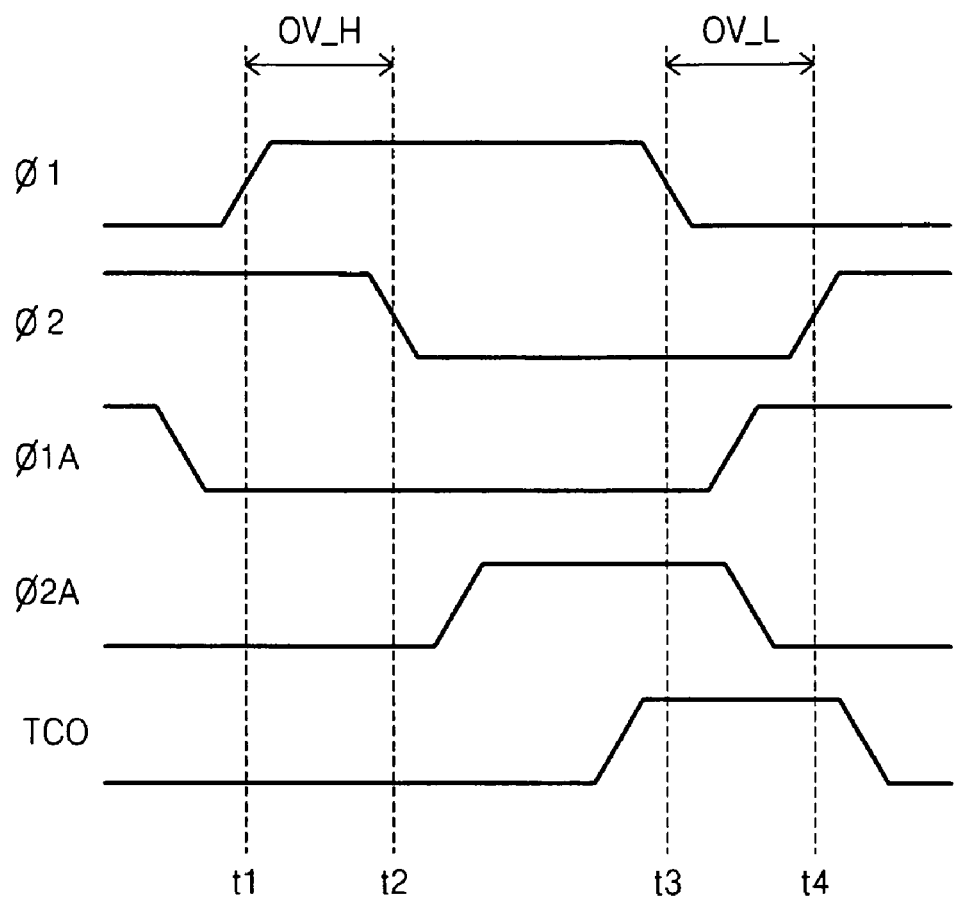
FIG. 2B is a waveform diagram of signals of the semiconductor device of FIG. 1 according to another example embodiment.

FIG. 2B is a waveform diagram of signals of the semiconductor device 100 of FIG. 1, according to another example embodiment. Referring to FIGS. 1 through 2B, FIG. 2B illustrates a case where the phase of a first input signal Ø1 is not opposite to that of a second input signal Ø2, unlike in FIG. 2A. That is, referring to FIG. 2B, the first input signal Ø1 and the second input signal Ø2 are in the same logic state in time intervals OV_H and OV_L.

The first input signal Ø1 and the second input signal Ø2 illustrated in FIG. 2B may not be used in a conventional charge pump. In a conventional charge pump, the first input signal Ø1 and the second input signal Ø2 illustrated in FIG. 2B may cause pumping loss, output loss, and/or short-circuit loss. Pumping loss may occur in the time interval OV_H where both the first input signal Ø1 and the second input signal Ø2 are in the first logic state. Output loss may occur in the time interval OV_L where both the first input signal Ø1 and the second input signal Ø2 are in the second logic state. Also, short-circuit loss may occur in a time interval where transition of the first input signal Ø1 and the second input signal Ø2 occur.

Output loss refers to the unintended charging of the capacitors CL1 and CR1 in the semiconductor device 100. For example, the semiconductor device 100 may be assumed to not include the first controller unit 160 and the second controller unit 180. In such an conventional semiconductor device, if both the first input signal Ø1 and the second input signal Ø2 are in the second logic state, then (i) the MOS transistors ML1 and MR1 are turned off, (ii) the MOS transistors ML2 and MR2 are turned on, and (iii) electric charges charged in a capacitor of the output node Vout move toward the nodes BL and BR. This causes charging of the capacitors CL1 and CR1 with the electric charges. Such a phenomenon is referred to as the output loss.

However, in the semiconductor device 100 according to an example embodiment, the pumping loss, the output loss and the short-circuit loss may not occur. This remains true even if the first input signal Ø1 and the second input signal Ø2 illustrated in FIG. 2B are used. A more detailed explanation is provided.

Before time t1 in FIG. 2B, the semiconductor device 100 may operate similar to the corresponding time before t1 illustrated in FIG. 2A (initialization operation). Briefly, the semiconductor device 100 operates similar to the time before t1 if the second control signal Ø1A is in first logic state. Since operation of the semiconductor device 100 before time t1 is similar in FIGS. 2A and 3B, further description regarding the time before t1 is not be provided.

Time interval OV_H is in a time interval between times t1 and t2. In the time interval OV_H both the first input signal Ø1 and the second input signal Ø2 are in the first logic state. In addition, in the time interval OV_H, (i) the first input signal Ø1 and the second input signal Ø2 are in the first logic state, and (ii) a first control signal TCO, a second control signal Ø1A and a third control signal Ø2A are in the second logic state. Thus, the MOS transistors ML1, ML2, MR1, and MR2 may be turned off and the MOS transistors ML0, ML3, MR0, and MR3 may be turned on. Since the MOS transistors ML1, ML2, MR1, and MR2 are turned off, no electric charges may move (i) from the first boosting node BL and the second boosting node BR to a node to which initial voltage Vin is applied, and (ii) from the output node Vout to the first boosting node BL and the second boosting node BR. Accordingly a leakage current is not generated in the time interval OV_H in which both the first input signal Ø1 and the second input signal Ø2 are in the first logic state, thereby preventing the pumping loss and the short-circuit loss from occurring.

In a time interval between times t2 and t3 in FIG. 2B, the semiconductor device 100 performs a charge pumping operation similar to the charge pumping operation described in FIG. 2A with reference to the time interval between the times t4 and t5. More specifically, charge pumping may be performed in a time interval in which (i) the third control signal Ø2A is in the first logic state and (ii) the first control signal TCO is in the second logic state. Since charge pumping has been specifically described above with reference to FIG. 2A, further description regarding the time interval between the times t4 and t5 is not be provided.

A time interval between times t3 and t4 is the time interval OV_L, in which both the first input signal Ø1 and the second input signal Ø2 are in the second logic state. In the time interval OV_L, (i) the first input signal Ø1 and the second input signal Ø2 are in the second logic state and (ii) the first control signal TCO is in the first logic state. Thus, the MOS transistors ML3 and MR3 are turned off. Since both the MOS transistors ML3 and MR3 are turned off in the time interval OV_L, no electric charges move from the output node Vout to the first boosting node BL and the second boosting node BR. Accordingly, no leakage current is generated in the time interval OV_L since both the first input signal Ø1 and the second input signal Ø2 are in the second logic state. Lack of the leakage current prevents the output loss from occurring.

Figure 3:
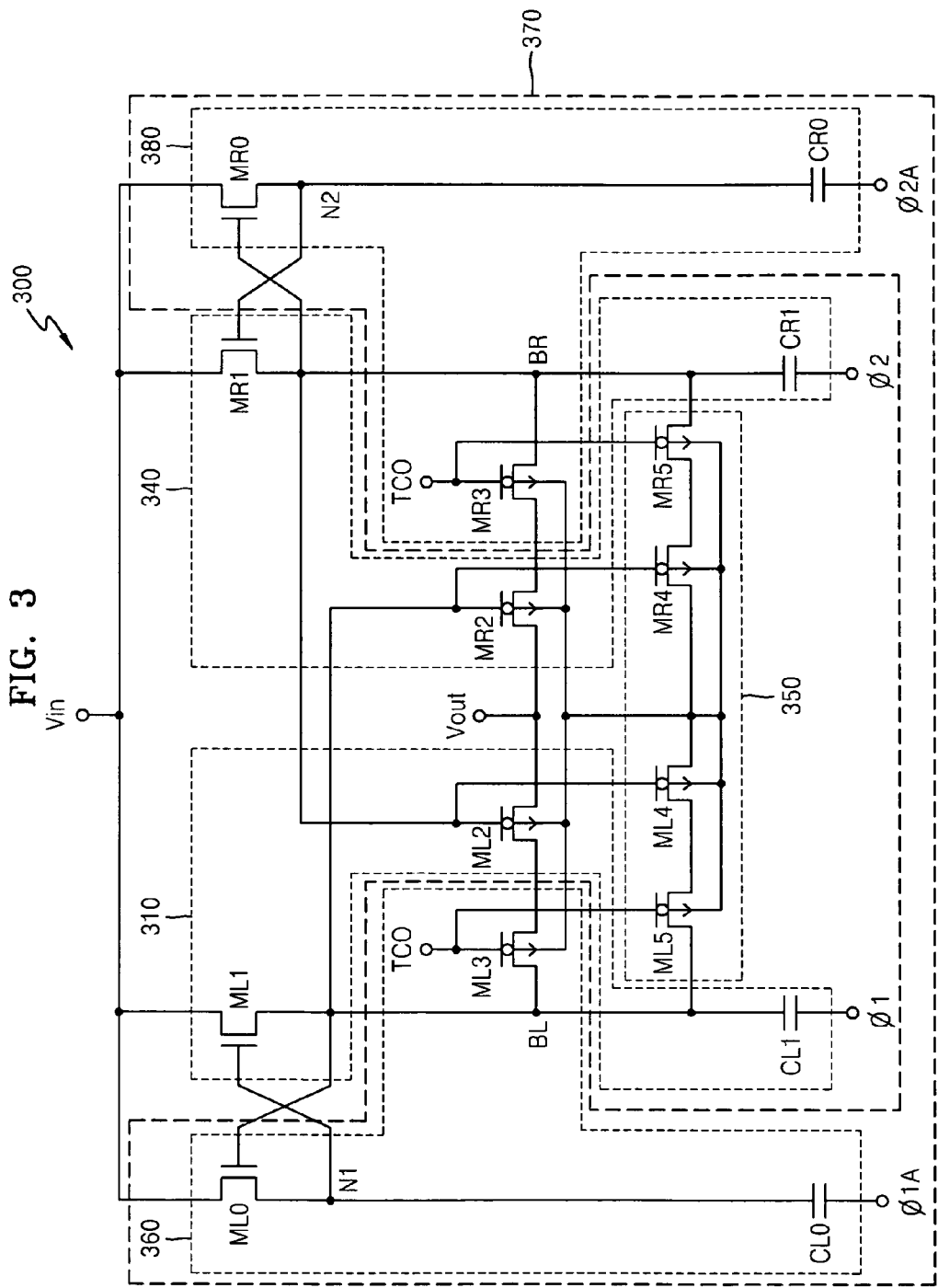
FIG. 3 is a circuit diagram of a semiconductor device for performing charge pumping, according to an example embodiment.

FIG. 3 is a circuit diagram of a semiconductor device 300 for performing charge pumping, according to another example embodiment. Referring to FIGS. 1 and 3, the semiconductor device 300 includes a first pumping unit 310, a second pumping unit 340, a controller 370 and a bulk voltage maintaining unit 350. The controller 370 includes a first controller unit 360 and a second controller unit 380. The operations and constructions of the first pumping unit 310, the second pumping unit 340, the first controller unit 360 and the second controller unit 380 of FIG. 3 are respectively similar to those of the first pumping unit 110, the second pumping unit 140, the first controller unit 160 and the second controller unit 180 of FIG. 1.

As described above, the MOS transistors ML2, ML3, MR2, and MR3 that respectively constitute the first transmission unit 117, the second transmission unit 147, the first transmission control unit 162 and the second transmission control unit 182 illustrated in FIG. 1, may be embodied as PMOS transistors. However, PMOS transistors may require a way to prevent bulk forward bias phenomenon and the latch-up phenomenon from occurring. For example, bulk terminals of the PMOS transistors are directly connected to the output node Vout. When the PMOS transistors have a high source voltage and a low bulk voltage, a bulk forward bias phenomenon and a latch-up phenomenon may occur. Thus in order to solve such problems of a PMOS transistor, the semiconductor device 300 further includes the bulk voltage maintaining unit 350 to increase the bulk voltages of the PMOS transistors ML2, ML3, MR2, and MR3 to a desired (or, alternatively, a predetermined) level and maintain the increased voltage, thereby preventing the bulk forward bias phenomenon and the latch-up phenomenon from occurring.

The bulk voltage maintaining unit 350 includes a plurality of PMOS transistors ML4, ML5, MR4, and MR5. Regarding PMOS transistor ML5, a first boosting node BL is connected to a first terminal of the PMOS transistor ML5 and the first control signal TCO is supplied to a gate of the PMOS transistor ML5. Regarding PMOS transistor ML4, the first terminal and gate of the PMOS transistor ML4 are respectively connected to a second terminal of a PMOS transistor ML5 and a second boosting node BR. Regarding PMOS transistor MR4, a first terminal and gate of a PMOS transistor MR4 are respectively connected to a second terminal of the PMOS transistor ML4 and the first boosting node BL. Regarding PMOS transistor MR5, a first terminal and a second terminal of the PMOS transistor MR5 are respectively connected to the second terminal of the PMOS transistor MR4 and the second boosting node BR, and the first control signal TCO is supplied to a gate of the PMOS transistor MR5. A node between the PMOS transistor ML4 and the PMOS transistor MR4 is connected to the bodies of the PMOS transistors ML2, ML3, ML4, ML5, MR2, MR3, MR4, and MR5.

Figure 4:
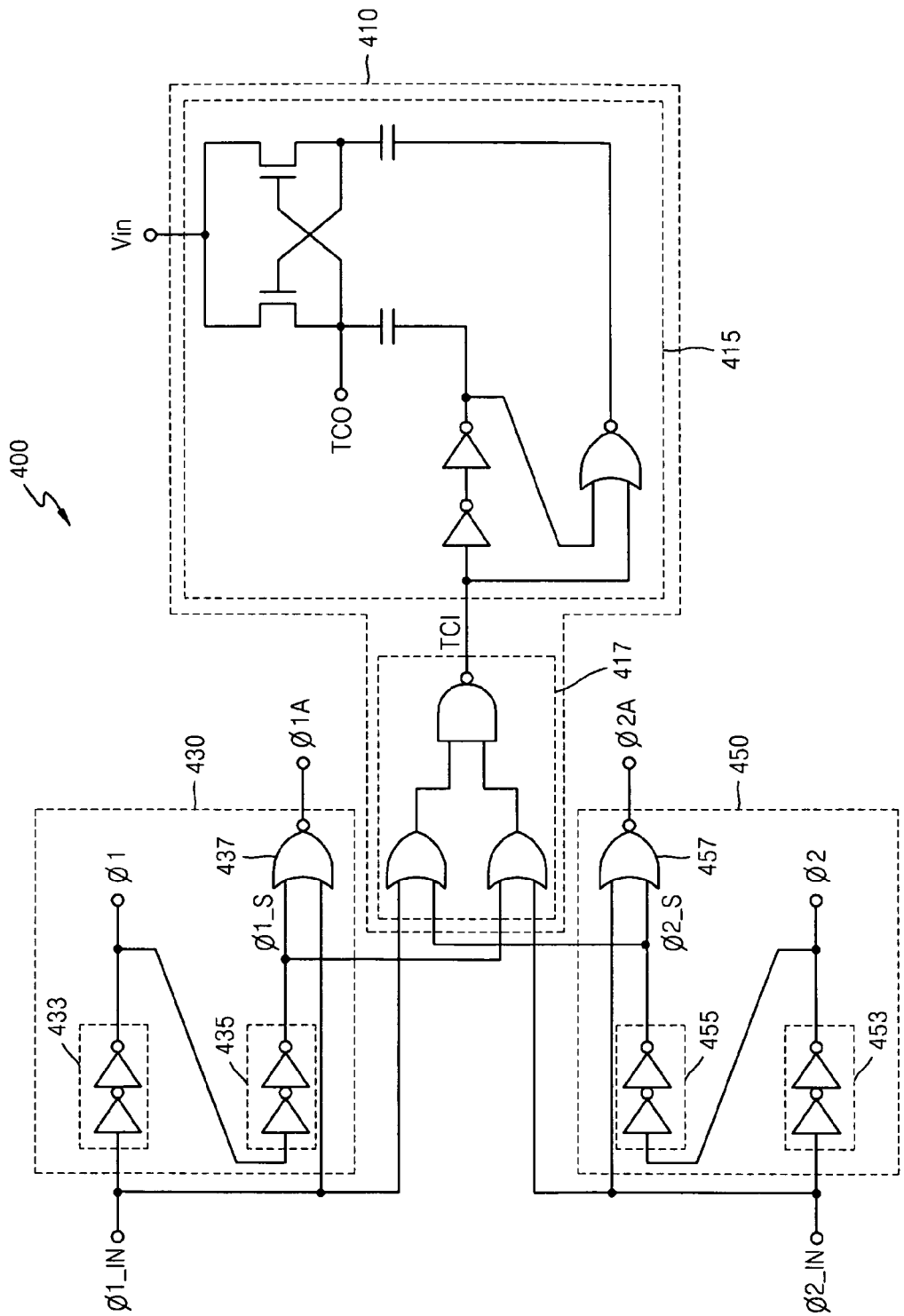
FIG. 4 is a circuit diagram of a control signal generation unit generating first through third control signals of FIGS. 1 through 3, according to an example embodiment.

FIG. 4 is a circuit diagram of a control signal generation unit 400 that generates the first through third control signals TCO, Ø1A, and Ø2A illustrated in FIGS. 1 through 3, according to an example embodiment. The control signal generation unit 400 includes a first operation unit 410, a second operation unit 430 and a third operation unit 450. The first operation unit 410 generates the first control signal TCO from a first initial input signal Ø1_IN and a second initial input signal Ø2_IN. The second operation unit 430 generates a first input signal Ø1 by delaying the first initial input signal Ø1_IN, and generates the second control signal Ø1A from the first initial input signal Ø1_IN. The third operation unit 450 generates a second input signal Ø2 by delaying the second initial input signal Ø2_IN, and generates the third control signal Ø2A from the second initial input signal Ø2_IN.

The first operation unit 410 includes an OR-NAND logic circuit 417 and a control signal boosting unit 415. The second operation unit 430 includes a first input signal generation unit 433, a first delayer 435 and a first NOR gate 437. The third operation unit 450 includes a second input signal generation unit 453, a second delayer 455 and a second NOR gate 457. The operations of the first through third operation units 410, 430, and 450 are described in further detail with reference to FIGS. 5A and 5B.

Figure 5A:
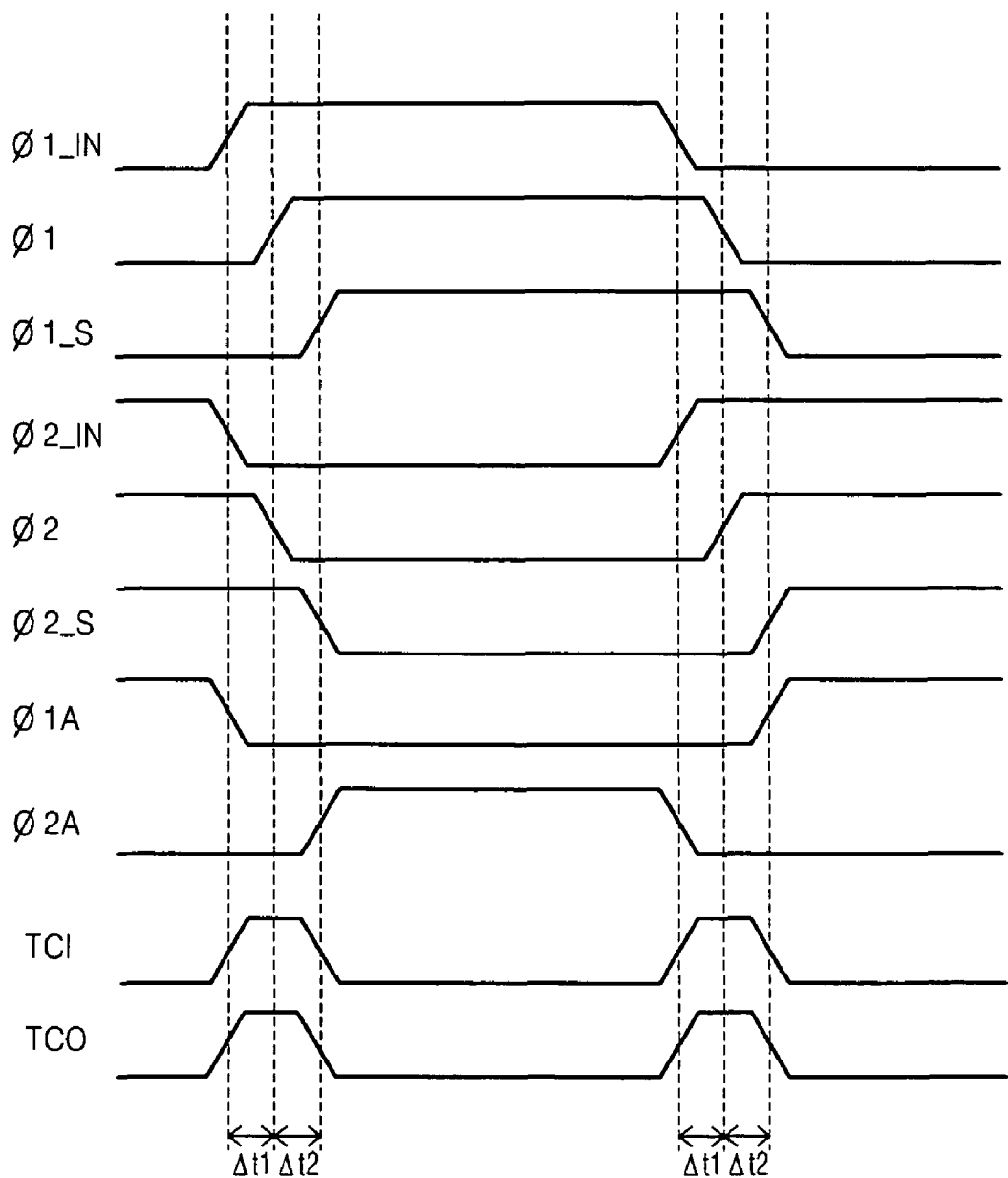
FIG. 5A is a waveform diagram of signals of the control signal generation unit of FIG. 4, according to an example embodiment.
Figure 5B:
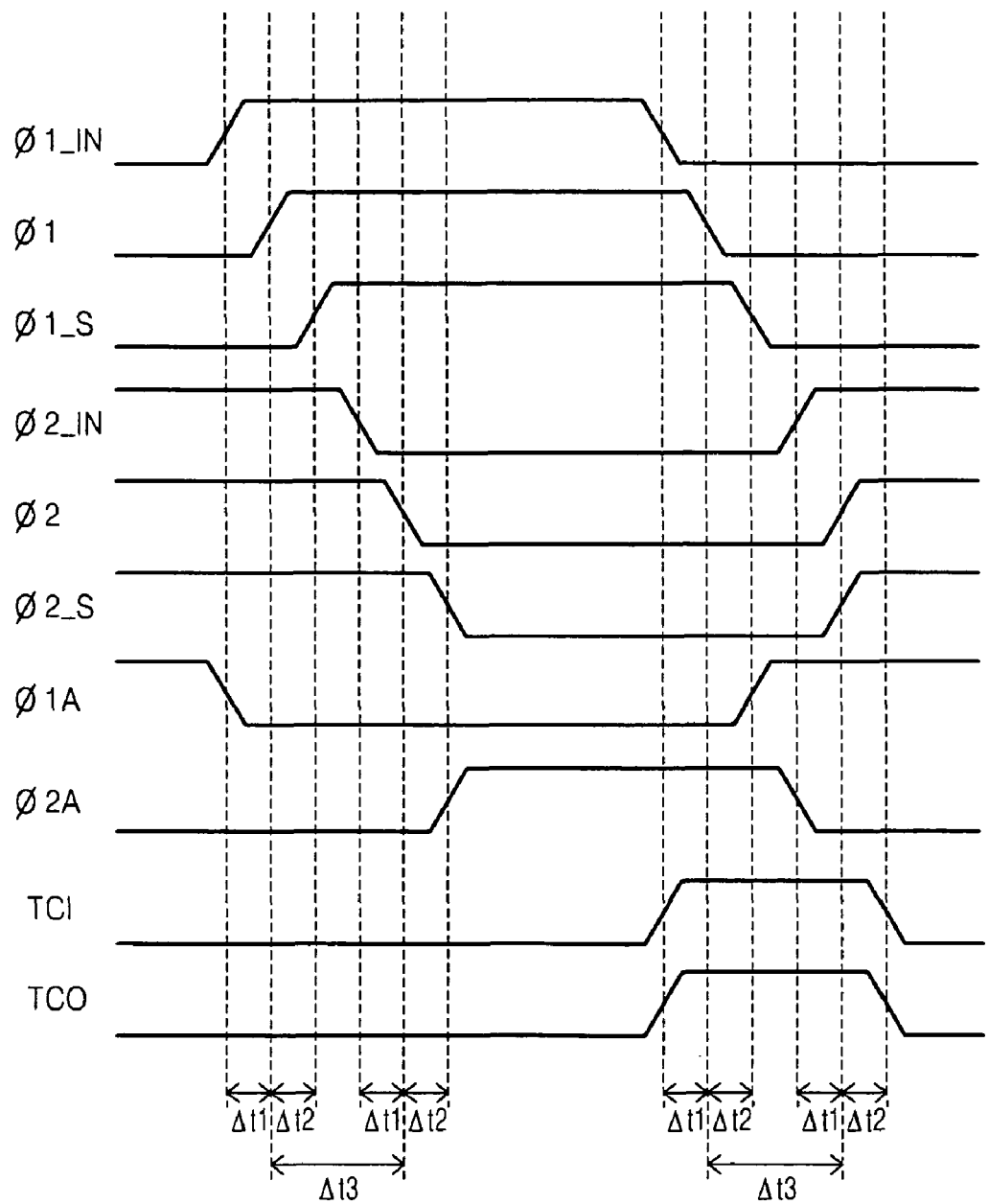
FIG. 5B is a waveform diagram of signals of the control signal generation unit of FIG. 4, according to another example embodiment.

FIG. 5A is a waveform diagram of signals of the control signal generation unit 400 of FIG. 4, according to an example embodiment. FIG. 5B is a waveform diagram of signals of the control signal generation unit 400 of FIG. 4, according to another example embodiment.

FIG. 5A illustrates a case where the phase of a first input signal Ø1 is opposite to that of a second input signal Ø2. More specifically, the phase of a first initial input signal Ø1_IN is opposite to that of a second initial input signal Ø2_IN. FIG. 5B illustrates a case where the phase of the first input signal Ø1 is not opposite to that of the second input signal Ø2. More specifically, the phase of the first initial input signal Ø1_IN is not opposite to that of the second initial input signal Ø2_IN.

Referring to FIGS. 4 through 5B, the first input signal generation unit 433 may delay the first initial input signal Ø1_IN by a first time Δt1 and outputs the first input signal Ø1. The first delayer 435 may delay the first input signal Ø1 by a second time Δt2 and outputs a first delayed signal Ø1_S. The first input signal generation unit 433 and/or the first delayer 435 may both be embodied with an inverter chain, but further embodiments are not limited thereto. That is, if signals are delayed using other delay units, it is possible to obtain the same effects. A first NOR gate 437 of the first input signal generation unit 433 performs a NOR operation on the first initial input signal Ø1_IN and the first delayed signal Ø1_S and outputs a second control signal Ø1A. The second operation unit 430 makes it possible to generate the second control signal Ø1A with a phase opposite to the phase of the first input signal Ø1. Also, the second control signal Ø1A may have a time interval during the second logic state that is wider than time interval of the first input signal Ø1 during the first logic state.

The second input signal generation unit 453 delays the second initial input signal Ø2_IN by the first time Δt1 and outputs the second input signal Ø2. The second delayer 455 delays the second input signal Ø2 by the second time Δt2 and outputs a second delayed signal Ø2_S. The second input signal generation unit 453 and the second delayer 455 may both be embodied with an inverter chain similar to the first input signal generation unit 433 and the first delayer 435. Further embodiments are not limited the examples described above. The first input signal generation unit 433 and the second input signal generation unit 453 may delay signals by the first time Δt1 and the first delayer 435 and the second delayer 455 may also delay signals by the second time Δt2. The second NOR gate 457 performs the NOR operation on the second initial input signal Ø2_IN and the second delayed signal Ø2_S and outputs a third control signal Ø2A. The third operation unit 450 makes it possible to generate the third control signal Ø2A with a phase opposite to the phase of the second input signal Ø2. Also, the third control signal Ø2A may have a time interval during the first logic state that is narrower than the time interval of the second input signal Ø2 during the second logic state.

The OR-NAND logic circuit 417 includes two OR gates and a NAND gate. The OR-NAND logic circuit 417 performs an OR operation on the first initial input signal Ø1_IN and the second delayed signal Ø2_S. The OR-NAND logic circuit 417 also performs an OR operation on the second initial input signal Ø2_IN and the first delayed signal Ø1_S. Thereafter, the OR-NAND logic circuit 417 performs a NAND operation based on the results of the two OR operations.

The control signal boosting unit 415 boosts the voltage of an output signal TCI of the OR-NAND logic circuit 417 and then outputs the first control signal TCO. The control signal boosting unit 415 illustrated in FIG. 4 is an example embodiment, and further embodiments are not limited to the structure illustrated in FIG. 4. For example, various circuits may be used as the control signal boosting unit 415 as long as they can boost the voltage of the output signal TCI of the OR-NAND logic circuit 417 and output the first control signal TCO. As described above, the MOS transistor ML1 and the MOS transistor MR1 may be turned on when a voltage that is equal to or greater than the sum of the power supply voltage VDD and the threshold voltage Vth of each of the MOS transistors ML1 and MR1 is applied to gates of the MOS transistor ML1 and the MOS transistor MR1. Similarly, the MOS transistor ML3 and MOS transistor MR3 may be turned on when a voltage that is less than or equal to the sum of the power supply voltage VDD and the threshold voltage Vth of each of the MOS transistors ML3 and MR3 is applied to the gates of the MOS transistor ML3 and MOS transistor MR3. Thus when the first control signal TCO is logic high, the voltage of the first control signal TCO may be greater than a voltage 2VDD−Vth. Also, when the first control signal TCO is logic low, the voltage of the first control signal TCO may be lower than a voltage 2VDD+Vth. The first operation unit 410 makes it possible to generate the first control signal TCO (i) in the first logic state during a time interval in which the first input signal Ø1 and the second input signal Ø2 are in the same logic state, and (ii) in the second logic state during a time interval in which the first input signal Ø1 and the second input signal Ø2 are in different logic states.

If the phase of the first input signal Ø1 is not opposite to that of the second input signal Ø2, the first control signal TCO may be in the second logic state in a time interval Δt3 in which the first input signal Ø1 and the second input signal Ø2 are in the first logic state, as illustrated in FIG. 5B. Since both the first input signal Ø1 and the second input signal Ø2 are in the first logic state in this case (as discussed with regard to FIG. 1), both the transistors ML2 and MR2 are turned off, and thus, the leakage current is not generated in a direction from the output node Vout to the first and second boosting nodes BL and BR. Accordingly, even if the first control signal TCO is in the second logic state, the pumping loss does not occur.

An example embodiment of the control signal generation unit 400 and the signals generated by the control signal generation unit 400 have been described above. Further embodiments are not limited to generating the first through third control signals TCO, Ø1A, and Ø2A by using the control signal generation unit 400 of FIG. 4. That is, the first through third control signals TCO, Ø1A, and Ø2A may be generated as illustrated in FIGS. 2A and 2B using another device.

While example embodiments are provided for illustrative purposes, it will be understood that various changes in form and details may be made therein without departing from the spirit and scope of the following claims.

What is claimed is:

1. A semiconductor device for performing charge pumping, the semiconductor device comprising:
a first pumping unit configured to output a boosted voltage via an output node based on a first input signal and an initial voltage, such that the boosted voltage is greater than the initial voltage;
a second pumping unit configured to output the boosted voltage via the output node based on a second input signal and the initial voltage; and
a controller configured to control the first and second pumping units, each of the first and second pumping units further includes,
an initialization unit configured to control a voltage of a boosting node to be equal to the initial voltage during an initialization operation,
a boosting unit configured to boost the voltage of the boosting node to the boosted voltage based on one of the first and second input signals, and
a transmission unit configured to control output of the boosted voltage; and wherein
the controller at least one of (i) controls the transmission unit to selectively output the boosted voltage, and (ii) disables the initialization unit, if the first input signal and the second input signal are in the same logic state.

2. The semiconductor device of claim 1, wherein the controller
disables the initialization unit if the first and second input signals are in a first logic state, and
limits the output of the boosted voltage from the transmission unit if the first and second input signals are in a second logic state.

3. The semiconductor device of claim 1, wherein the controller (i) limits the output of the boosted voltage from the transmission unit and (ii) disables the initialization unit if a transition of the first input signal and the second input signal simultaneously occur.

4. The semiconductor device of claim 1, further comprising:
a control signal generation unit configured to (i) generate first, second, and third control signals and (ii) output the first, second, and third control signals to the controller,
wherein,
the first control signal is in a first logic state if the first and second input signals are in the same logic state, and is in a second logic state if the first and second input signals are in different logic states,
the second control signal has an opposite phase to a phase of the first input signal and is in the second logic state for a longer time interval than a time interval during which the first input signal is in the first logic state, and
the third control signal has an opposite phase to a phase of the second input signal and is in the first logic state for a shorter time interval than a time interval during which the second input signal is in the second logic state.

5. The semiconductor device of claim 4, wherein the controller comprises:
a transmission control unit connected between the boosting node and the transmission unit, and configured to control output of the boosted voltage in response to the first control signal;
a first enable control unit configured to enable the initialization unit of the first pumping unit in response to the second control signal; and
a second enable control unit configured to enable the initialization unit of the second pumping unit in response to the third control signal.

6. The semiconductor device of claim 5, wherein the transmission control unit comprises:
a first MOS transistor connected between the boosting node of the first pumping unit and the transmission unit of the first pumping unit, such that the first control signal is supplied to a gate of the first MOS transistor; and
a second MOS transistor connected between the boosting node of the first pumping unit and the transmission unit of the second pumping unit, such that the first control signal is supplied to a gate of the second MOS transistor,
wherein the transmission unit of the first pumping unit is a third MOS transistor connected between the first MOS transistor and the output node, and having a gate connected to the boosting node of the second pumping unit, the transmission unit of the second pumping unit is a fourth MOS transistor connected between the second MOS transistor and the output node and having a gate connected to the boosting node of the first pumping unit.

7. The semiconductor device of claim 6, further comprising a bulk voltage maintaining unit maintaining bulk voltages of the first, second, third, and fourth MOS transistors at a constant level.

8. The semiconductor device of claim 4, wherein the control signal generation unit further comprises:

a first operation unit configured to generate the first control signal based on a first initial input signal and a second initial input signal;

a second operation unit configured to generate (i) the second control signal based on the first initial input signal and (ii) the first input signal by delaying the first initial input signal; and a third operation unit configured to generate (i) the third control signal based on the second initial input signal and (ii) the second input signal by delaying the second initial input signal.

9. The semiconductor device of claim 8, wherein the control signal generation unit further comprises:

an input signal generation unit configured to output (i) the first input signal by delaying the first initial input signal and (ii) the second input signal by delaying the second initial input signal.

10. The semiconductor device of claim 1, wherein the transmission unit of the first pumping unit includes a first MOS transistor connected between the controller and the output node, and having a gate connected to the boosting node of the second pumping unit, the transmission unit of the second pumping unit includes a second MOS transistor connected between the controller and the output node, and having a gate connected to the boosting node of the first pumping unit, and the semiconductor device further includes a bulk voltage maintaining unit configured to maintain bulk voltages of the first MOS transistor and the second MOS transistor at a constant level.

11. The semiconductor device of claim 10, wherein the bulk voltage maintaining unit includes a plurality of transistors.

12. The semiconductor device of claim 1, wherein the boosting unit includes at least one capacitor charged with electric charges until a voltage of the at least one capacitor is equal to the initial voltage.

13. A semiconductor device for performing charge pumping, the semiconductor device comprising: a first pumping unit configured to output a boosted voltage via an output node based on a first input signal and an initial voltage, such that the boosted voltage is greater than the initial voltage; a second pumping unit configured to output the boosted voltage via the output node based on a second input signal and the initial voltage, such that each of the first and second pumping units further includes an initialization unit configured to control a voltage of a boosting node to be equal to the initial voltage during an initialization operation, a boosting unit configured to boost the voltage of the boosting node to the boosted voltage based on one of the first and second input signals, and a transmission unit configured to control output of the boosted voltage; wherein the controller is further configured to control the first and the second pumping units based on at least a logic state of the first input signal and the second input signal; and wherein the controller controls the output of the boosted voltage from the transmission unit if the first input signal and the second input signals are in the same logic state.

14. A semiconductor device for performing charge pumping, the semiconductor device comprising: a first pumping unit configured to output a boosted voltage via an output node based on a first input signal and an initial voltage, such that the boosted voltage is greater than the initial voltage; a second pumping unit configured to output the boosted voltage via the output node based on a second input signal and the initial voltage, such that each of the first and second pumping units further includes an initialization unit configured to control a voltage of a boosting node to be equal to the initial voltage during an initialization operation, a boosting unit configured to boost the voltage of the boosting node to the boosted voltage based on one of the first and second input signals, and a transmission unit configured to control output of the boosted voltage; wherein the controller is further configured to control the first and the second pumping units based on at least a logic state of the first input signal and the second input signal; and wherein the controller disables the initialization unit if the first input signal and the second input signals are in the same logic state.

* * * * *